United States Patent
Hashiguchi et al.

(10) Patent No.: US 7,660,527 B2
(45) Date of Patent: Feb. 9, 2010

(54) OPTICAL NETWORK DESIGN METHOD

(75) Inventors: Tomohiro Hashiguchi, Kawasaki (JP); Toru Katagiri, Kawasaki (JP); Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 11/463,126

(22) Filed: Aug. 8, 2006

(65) Prior Publication Data

US 2007/0264018 A1 Nov. 15, 2007

(30) Foreign Application Priority Data

Apr. 27, 2006 (JP) .............................. 2006-123908

(51) Int. Cl.
H04B 10/00 (2006.01)
H04B 10/08 (2006.01)

(52) U.S. Cl. .......................................... 398/34; 398/35

(58) Field of Classification Search ................... 398/25, 398/34, 35
See application file for complete search history.

(56) References Cited

U.S. PATENT DOCUMENTS 6,829,216 B1 * 12/2004 Nakata ....................... 370/228

| 2003/0004845 | A1 |   | 1/2003 | Takeda et al. |
| 2003/0099014 | A1 | * | 5/2003 | Egner et al. ................. 359/124 |
| 2004/0010592 | A1 |   | 1/2004 | Carver et al. |
| 2005/0185967 | A1 | * | 8/2005 | Hoshida ..................... 398/173 |
| 2006/0045523 | A1 | * | 3/2006 | Kozischek .................. 398/58 |
| 2008/0080554 | A1 | * | 4/2008 | Hashiguchi et al. ......... 370/468 |

FOREIGN PATENT DOCUMENTS

| JP | 2000-293569 | 10/2000 |
| JP | 2003-520496 | 7/2003 |

* cited by examiner

*Primary Examiner*—Nathan M Curs
(74) *Attorney, Agent, or Firm*—Staas & Halsey LLP (57) ABSTRACT

In the case that a client signal having a bandwidth larger than BW divided by P exists, where the P is the number of client ports of one optical transponder card and the BW is an optical signal band, it is configured to accommodate client signals in one optical transponder card by combining plural client signals of which the total band is no greater than the BW and which have different bands so as to make it a maximum within the aforementioned range.

11 Claims, 9 Drawing Sheets

OPTICAL NETWORK DESIGN METHOD

BACKGROUND OF THE INVENTION

1. Field of the Invention

The present invention relates to an optimum accommodation design method for a client signal using an optical transmission/reception card, and an optimum design method for an optical network.

2. Description of the Related Art

In recent years, an optical transmission/reception card (transponder card), generically called ADM on λ, ADM on a card, et cetera, integrally equipped with an Add/Drop function of a SONET signal (ANSI T1. 105 recommendation: Synchronous Optical Network Basic Description Including Multiplex Structures, Rates and Formats) and an SDH signal (ITU-T Recommendation G.803: Architecture of Transport Networks Based on the Synchronous Digital Hierarchy) and an optical signal transponder function (i.e., the function of generating a signal light) has been developed for enabling a construction of an upper layer network accommodating diverse client signals including a SONET signal, SDH signal (simply "SONET/SDH" hereinafter), Ethernet (registered trademark) and fiber channel on an optical network structured by a wavelength division multiplexing (WDM) system.

The focused here is a design technique for accommodating a client signal, which is accommodated by a SONET/SDH network built up on a WDM net, to a SONET/SDH frame.

Figure 1:
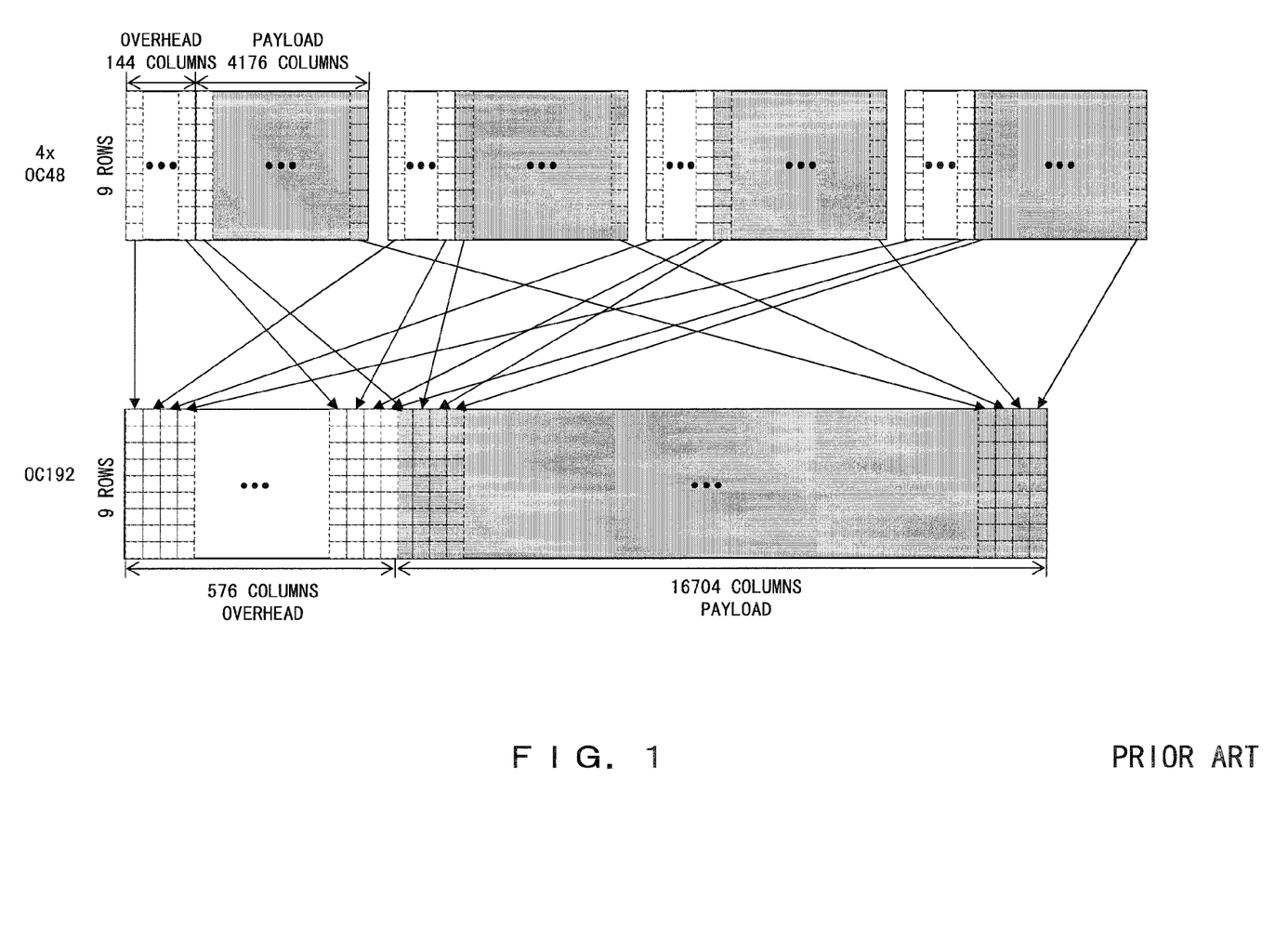
FIG. 1 is a diagram exemplifying a mapping of a SONET signal frame.

FIG. 1 exemplifies a mapping of a SONET signal frame.

FIG. 1 exemplifies a mapping of four OC48s, which are SONET signals, to a SONET frame of OC192.

When multiplexing four OC48s and mapping in a SONET frame of the OC192, an overhead part of each frame of the OC48 is separated and it is mapped together with an overhead part of the OC192 frame. And each payload part of the OC48 is mapped together with that of the OC192.

Figure 2:
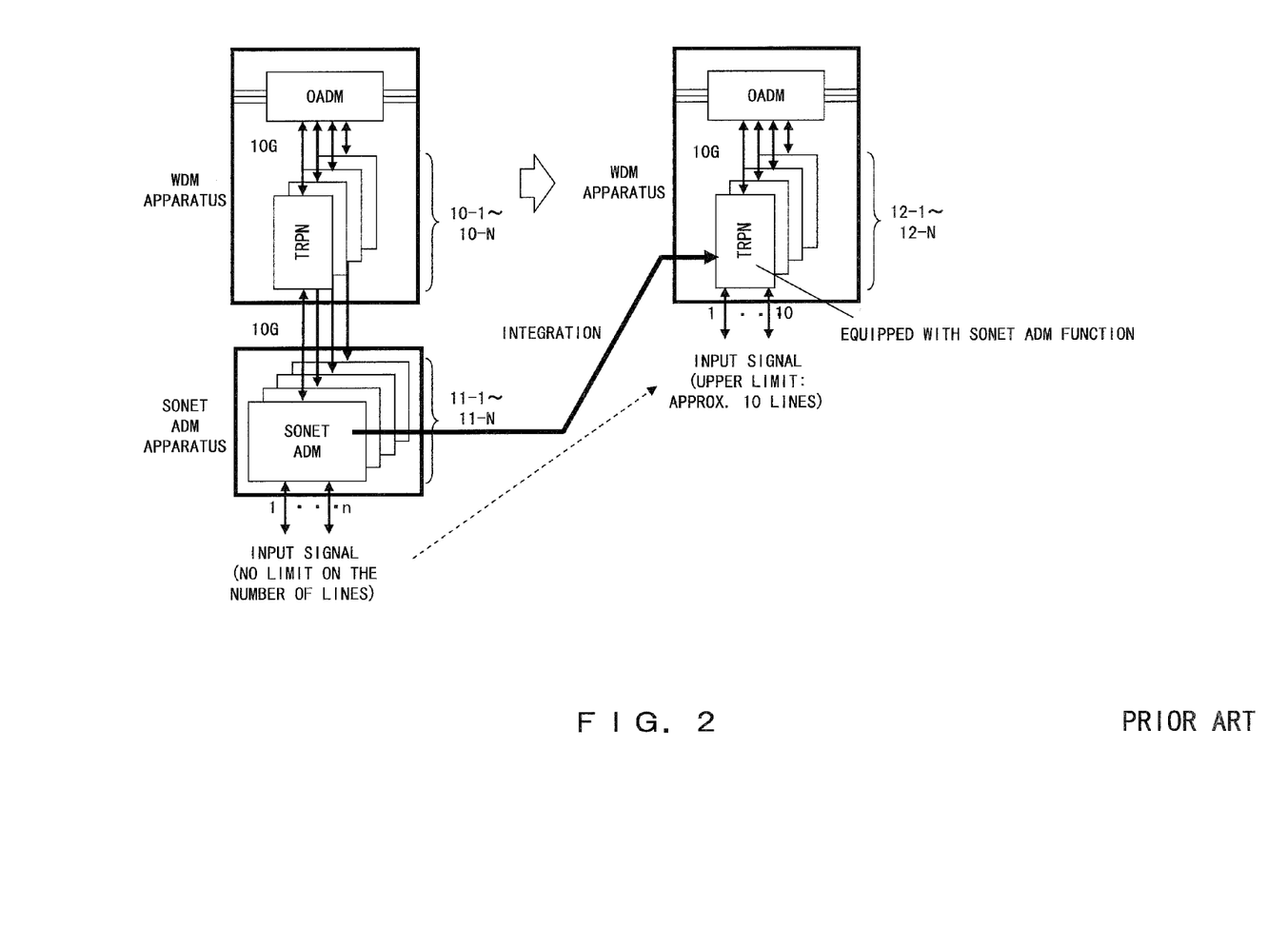
FIG. 2 is a diagram describing a technique that the present invention premises.

FIG. 2 is a diagram describing a technique premised by the present invention.

Conventionally, a WDM network and a SONET/SDH network built thereon are constituted by respectively different apparatuses, namely a WDM apparatus and an SONET/SDH ADM (Add/Drop Multiplexing) apparatus. The WDM apparatus is one for carrying out a wavelength multiplexing by making optical signals carried on different wavelength lights, while the SONET/SDH ADM apparatus is one generating a signal carried on one wavelength light by applying a time division multiplexing to client signals of individual channels. A purpose of a design for accommodating a client signal on the network is to accommodate all the given client signals and minimize the number of SONET/SDH ADM apparatuses required for the accommodation, thereby minimizing an apparatus cost. In the case of accommodating client signals by using the SONET/SDH ADM apparatus, such accommodation has conventionally been carried out so as to raise bandwidth usage efficiency of each optical signal in consideration of a bandwidth of each client signal. The number of client signal ports of the SONET/SDH ADM apparatus is generally large, making it unnecessary to consider the number of client signals per optical signal, and therefore a combination gaining the maximum band usage ratio of optical signals independent of the number of client signals has been selected in priority. That is, the conventional accommodation design has made it possible to equip an interface for the worth of the number of ports capable of accommodating client signals of the worth of a natural number obtained by the following expression (1) for all client signals:

$$\text{(The number of ports on the client signal side)} = \text{(optical signal bandwidth of a SONET/SDH ADM apparatus)} / \text{(bandwidth of one client signal)} \quad (1)$$

However, an optical transponder card (i.e., TRPN in FIG. 2) 10-1 through 10-N of a WDM apparatus, which had conventionally provided only a transponder function of an optical signal, has been integrally equipped with ADM functions 11-1 through 11-N of the SONET/SDH signal in the recent years as shown in FIG. 2 (i.e., TRPN 12-1 through 12-N). Owing to this, it is possible to build up a SONET/SDH ring network (i.e., a synchronous digital signal network) in addition to a WDM network just by the WDM apparatuses.

A patent document 1 is available as a conventional technique focusing on the most optimal distribution, noting a method for searching the most optimal portfolio with a high probability of acquiring a high profit. A patent document 2 is available as a conventional technique focusing on allocating shared resources, noting a technique for making an apparatus requiring a use of a shared resource bid an amount of required resources and price, and allocating a resource by processing the bid.

[Patent document 1] Japanese Patent Application Publication No. 2000-293569

[Patent document 2] Japanese Patent Application Publication No. 2003-520496

FIG. 2 shows the difference between the configurations of networks, which is constituted by a SONET/SDH ADM apparatus and a WDM apparatus, and that of an optical network which uses an optical transponder card comprising an ADM on λ function and constituted by the WDM apparatus only. Here, when accommodating a client signal by using the optical transponder card, what is different from the case of using the SONET/SDH ADM apparatus is that the number of client signal ports of the optical transponder cards 12-1 through 12-N is small, that is, at most 10 or thereabouts. This results in two client signals existing:

$$\text{(signal bandwidth of an optical signal of an optical transponder card)/(the number of client signal insertion ports of an optical transponder card)} < \text{(bandwidth of a client signal)} \quad (2)$$

$$\text{(signal bandwidth of an optical signal of an optical transponder card)/(the number of client signal insertion ports of an optical transponder card)} \leq \text{(bandwidth of a client signal)} \quad (3)$$

Figure 3A:
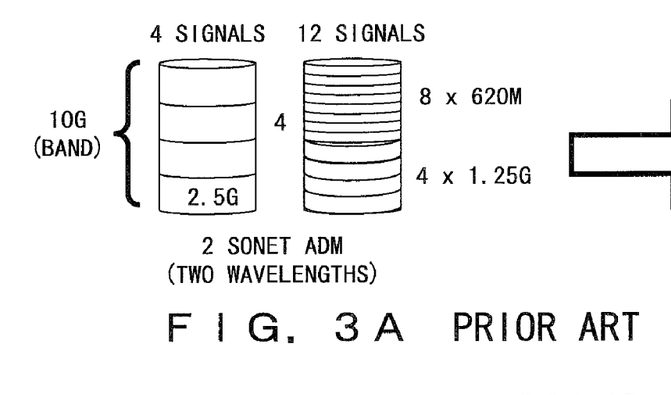
FIGS. 3A through 3C show diagrams exemplifying the case of a result of accommodating client signals being different between a use of a WDM apparatus equipped with an optical transponder card, and that of SONET/SDH ADM apparatus and WDM apparatus.
Figure 3B:
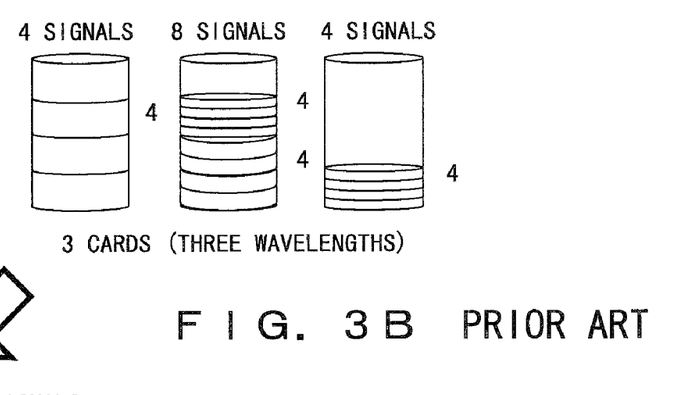
Figure 3C:
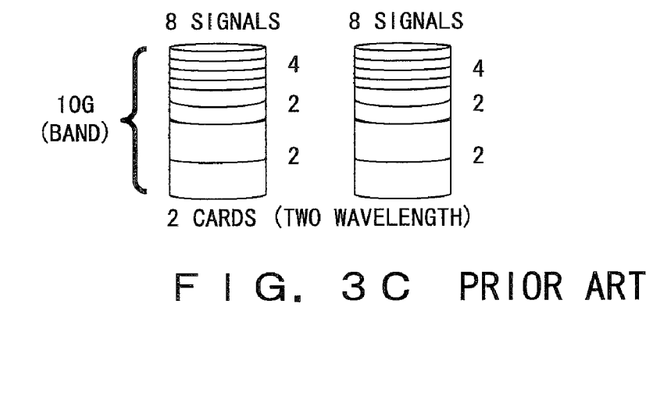

FIGS. 3A through 3C exemplify the case of an accommodation result of a client signal being different between a configuration using the SONET/SDH ADM apparatus and WDM apparatus, and the one using the WDM apparatus equipped with the optical transponder card.

The configurations shown in FIGS. 3A through 3C accommodate each signal (4, 4 and 8) of (2.5 G, 1.25 G and 622 Mbps) in 10 Gbps bandwidth per one wavelength. The number of client ports of the optical transponder card is configured as eight ("8").

Here, (bandwidth of an optical signal)/(the number of client signal insertion ports)=1.25 Gbps, allowing a client signal meeting both the above noted expressions (2) and (3) to coexist. A design using the conventional SONET/SDH ADM apparatus just maximize a usage ratio of a total band, and therefore accommodates a signal in the order of having a larger band, resulting in generating two optical signals. If it is likewise accommodated by the optical transponder card by considering only the band usage ratio, however, three optical transponder cards are necessary as shown in FIG. 3B, negating an accomplishment of an optimum accommodation by two cards shown in FIG. 3C. This is because the conventional system does not consider a limit in the number of client side ports of an optical transponder card.

SUMMARY OF THE INVENTION

The object of the present invention is to provide a design method for an optical network utilizing a maximum of both of a client side port and an optical signal band and minimizing the number of necessary optical transponder cards in an accommodation of a client signal by using the optical transponder card which is equipped with an ADM on λ function and for which the number of client side ports is finite.

According to the present invention, an optical network design method for designing a method for accommodating client signals in an optical transponder card, which is included in a multiplex apparatus used for an optical network, for outputting an optical signal by applying a time multiplexing and a wavelength multiplexing to signals from a client comprises the steps of: inputting, to a computer, the number of ports for client signals to the optical transponder card, an optical signal band thereof, a bandwidth of each client signal and the number of client signals having each bandwidth; the computer judging whether or not a client signal having a bandwidth larger than a value which is the optical signal bandwidth divided by the number of the ports; the computer extracting a combination of client signals of the worth of the number of ports, with the combination including at least one client signal having a maximum bandwidth and total band of which being within the optical signal band if a client signal having a bandwidth larger than a value which is the optical signal bandwidth divided by the number of the ports, exists; and the computer selecting a combination of which a total band becomes a maximum from among the extracted client signals as the combination of client signals accommodated in the optical transponder card.

The present invention enables an optimal accommodation design for client signals under a limit of the number of client ports, thereby minimizing the number of optical transponder cards required for accommodating client signals which is a given traffic demand and minimizing apparatus costs of the entirety of a network.

DESCRIPTION OF THE PREFERRED EMBODIMENTS

A characteristic of the present invention is an optical network design method for accommodating given client signals in a manner to gain the maximum utilizations of the number of ports on a client side and of an optical signal band, in the aforementioned order, by using an optical transponder card having both functions of a WDM apparatus and a SONET/SDH ADM apparatus. And an embodiment of the present invention automatically executes the optical network design method by a program.

A design method according to an embodiment of the present invention sequentially generates combinations of client signals one by one, from a group thereof given between the same nodes, satisfying all the conditions of: maximizing the number of client signals within the number of client insertion ports of an optical transponder card, maximizing the total bandwidth within an optical signal bandwidth of the optical transponder card and including at least one client signal having a maximum bandwidth.

Figure 4:
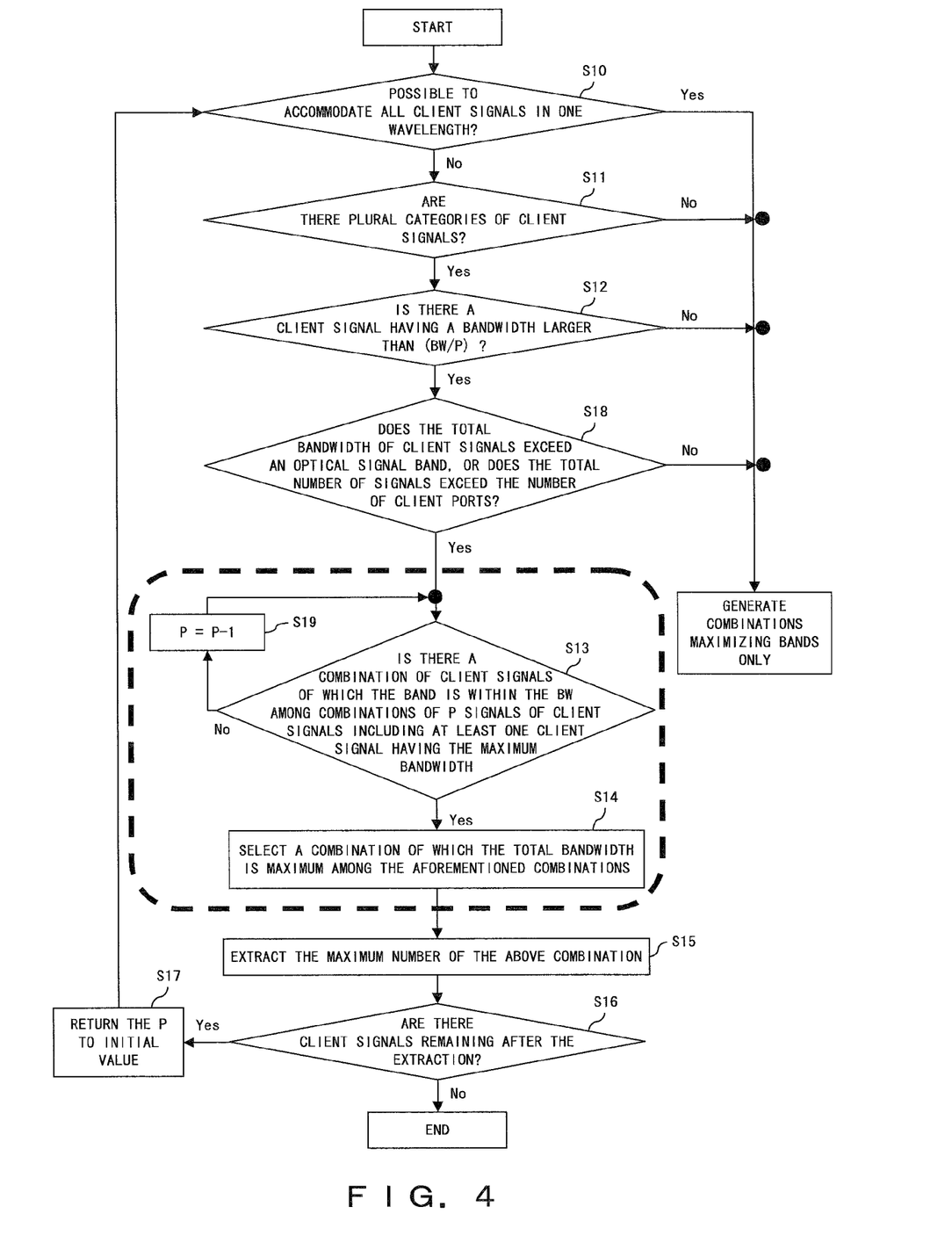
FIG. 4 is a flow chart showing a process procedure of a design method between the same nodes according to an embodiment of the present invention.

FIG. 4 is a flow chart showing a process procedure of a design method between the same nodes according to an embodiment of the present invention.

Referring to the flow chart shown by FIG. 4, a P is the number of client ports, a BW is an optical signal bandwidth. First, the step S10 judges whether or not all the client signals can be accommodated by one wavelength. If the judgment of the step S10 is "yes", the provided is the conventional method for generating a combination maximizing a band only. If the judgment of the step S10 is "no", the investigated is whether or not the following three conditions are all satisfied relating to the group of client signals between the same nodes:

Plural kinds of client signals exist (step S11).
A client signal with the maximum bandwidth satisfies the above noted expression (2) (step S12).
The total bandwidth of the client signals exceeds an optical signal band, or the number of all signals exceeds the number of client ports (step S18).

If at least one condition of the above noted three conditions is not satisfied, the procedure generates combinations of the worth of the number of client ports in sequence starting from a client signal with a large bandwidth as in the conventional method.

Comparably, if all the above noted three conditions are satisfied, the procedure first examines whether or not a combination exists, of which the number of signals is the same as the number of client ports P and also the total bandwidth is within the optical signal bandwidth BW (step S13). If such a combination exists ("yes" for S13), it extracts the maximum possible number of combinations of which a bandwidth is the maximum (S14 and S15) and, following the extraction of the same combinations, judges whether or not a client signal to be processed remains (step S16). If the judgment in the S16 is "no", it ends the process, while, if the judgment is "yes", it reverts the P to the initial value in the S17, and repeats the similar process from the start. If such a combination does not exist ("no" for S13), the procedure reduces, by one, the number of signals to be examined (S19), followed by repeating search processes for the similar combinations.

The next description is a detail of the process within the dotted line box of the flow chart shown in FIG. 4.

A first method retains a database of possible combinations of client signals in advance and applies it to the process within the dotted line box shown in FIG. 4. Elements required for the database are as follows:

- Categories and the number of signals of all the possibly existing client signals
- Total number of signals in combinations
- Total bandwidth of combinations The procedure extracts a combination of which the total bandwidth is within an optical signal band of the optical transponder card from among all the combinations of the number of client signals being within the number of client ports of the optical transponder card, and arranges them in a sequence of the following priority:

- The number of all signals is large
- Total bandwidth is large
- The number of client signals whose bandwidth is large is large When actually accommodating client signals, the procedure refers to the database made as described above and generates a combination which can be generated from the given client signals, which includes at least one client signal having the maximum bandwidth among the given client signals and which is the highest priority.

Tables 1 and 2 exemplify a database, specifying the bandwidth of the optical transponder card as OC192 (i.e., STS-192) and the number of ports on a client side as eight ("8") The client signals assume four kinds, i.e., OC 48 (STS-48), OC 12 (STS-12), OC 3 (STS-3) and GbE signals. Here, the GbE is assumed to be accommodated by using a Virtual Concatenation function of the SONET, the present specification accordingly handles it as STS-1-24v. In the tables 1 and 2, a BW indicates a total bandwidth in the unit of STS-1 in the combination of each client signal while signals indicate the number of client signals.

While the present example defines "the number of client signals whose bandwidth is large is large" as the third place in the priority of combinations, there is also a case of applying, as the third priority order, a combination of which the number of the most demanded client signals is large.

Further description is omitted here since an algorithm of a program for selecting the optimum entry must be realized easily by a person skilled in the art by considering such information as the tables 1 and 2 in addition to the conditions as described above.

TABLE 1

| OC4 8 | Gb E | OC1 2 | OC 3 | BW | Signals |
|---|---|---|---|---|---|
| 2 | 2 | 4 | 0 | 192 | 8 |
| 1 | 5 | 2 | 0 | 192 | 8 |
| 3 | 1 | 1 | 3 | 189 | 8 |
| 3 | 0 | 3 | 2 | 186 | 8 |
| 2 | 3 | 1 | 2 | 186 | 8 |
| 2 | 2 | 3 | 1 | 183 | 8 |
| 1 | 5 | 1 | 1 | 183 | 8 |
| 3 | 1 | 0 | 4 | 180 | 8 |
| 2 | 1 | 5 | 0 | 180 | 8 |
| 1 | 4 | 3 | 0 | 180 | 8 |
| 3 | 0 | 2 | 3 | 177 | 8 |
| 2 | 3 | 0 | 3 | 177 | 8 |

TABLE 1-continued

| OC4 8 | Gb E | OC1 2 | OC 3 | BW | Signals |
|---|---|---|---|---|---|
| 2 | 2 | 2 | 2 | 174 | 8 |
| 1 | 5 | 0 | 2 | 174 | 8 |
| 2 | 1 | 4 | 1 | 171 | 8 |
| 1 | 4 | 2 | 1 | 171 | 8 |
| 3 | 0 | 1 | 4 | 168 | 8 |
| 2 | 0 | 6 | 0 | 168 | 8 |
| 1 | 3 | 4 | 0 | 168 | 8 |
| 2 | 2 | 1 | 3 | 165 | 8 |
| 2 | 1 | 3 | 2 | 162 | 8 |
| 1 | 4 | 1 | 2 | 162 | 8 |
| 3 | 0 | 0 | 5 | 159 | 8 |
| 2 | 0 | 5 | 1 | 159 | 8 |
| 1 | 3 | 3 | 1 | 159 | 8 |
| 2 | 2 | 0 | 4 | 156 | 8 |
| 1 | 2 | 5 | 0 | 156 | 8 |
| 2 | 1 | 2 | 3 | 153 | 8 |
| 1 | 4 | 0 | 3 | 153 | 8 |
| 2 | 0 | 4 | 2 | 150 | 8 |
| 1 | 3 | 2 | 2 | 150 | 8 |
| 1 | 2 | 4 | 1 | 147 | 8 |
| 2 | 1 | 1 | 4 | 144 | 8 |
| 1 | 1 | 6 | 0 | 144 | 8 |
| 2 | 0 | 3 | 3 | 141 | 8 |
| 1 | 3 | 1 | 3 | 141 | 8 |
| 1 | 2 | 3 | 2 | 138 | 8 |
| 2 | 1 | 0 | 5 | 135 | 8 |
| 1 | 1 | 5 | 1 | 135 | 8 |
| 2 | 0 | 2 | 4 | 132 | 8 |
| 1 | 0 | 7 | 0 | 132 | 8 |
| 1 | 3 | 0 | 4 | 132 | 8 |
| 1 | 2 | 2 | 3 | 129 | 8 |
| 1 | 1 | 4 | 2 | 126 | 8 |
| 2 | 0 | 1 | 5 | 123 | 8 |
| 1 | 0 | 6 | 1 | 123 | 8 |
| 1 | 2 | 1 | 4 | 120 | 8 |
| 1 | 1 | 3 | 3 | 117 | 8 |
| 2 | 0 | 0 | 6 | 114 | 8 |
| 1 | 0 | 5 | 2 | 114 | 8 |
| 1 | 2 | 0 | 5 | 111 | 8 |
| 1 | 1 | 2 | 4 | 108 | 8 |
| 1 | 0 | 4 | 3 | 105 | 8 |
| 1 | 1 | 1 | 5 | 99 | 8 |
| 1 | 0 | 3 | 4 | 96 | 8 |
| 1 | 1 | 0 | 6 | 90 | 8 |
| 1 | 0 | 2 | 5 | 87 | 8 |
| 1 | 0 | 1 | 6 | 78 | 8 |
| 1 | 0 | 0 | 7 | 69 | 8 |
| 3 | 0 | 4 | 0 | 192 | 7 |
| 2 | 3 | 2 | 0 | 192 | 7 |
| 1 | 6 | 0 | 0 | 192 | 7 |
| 3 | 1 | 1 | 2 | 186 | 7 |
| 3 | 0 | 3 | 1 | 183 | 7 |
| 2 | 3 | 1 | 1 | 183 | 7 |
| 2 | 2 | 3 | 0 | 180 | 7 |
| 1 | 5 | 1 | 0 | 180 | 7 |
| 3 | 1 | 0 | 3 | 177 | 7 |
| 3 | 0 | 2 | 2 | 174 | 7 |
| 2 | 3 | 0 | 2 | 174 | 7 |
| 2 | 2 | 2 | 1 | 171 | 7 |
| 1 | 5 | 0 | 1 | 171 | 7 |
| 2 | 1 | 4 | 0 | 168 | 7 |
| 1 | 4 | 2 | 0 | 168 | 7 |
| 3 | 0 | 1 | 3 | 165 | 7 |
| 2 | 2 | 1 | 2 | 162 | 7 |
| 2 | 1 | 3 | 1 | 159 | 7 |
| 1 | 4 | 1 | 1 | 159 | 7 |
| 3 | 0 | 0 | 4 | 156 | 7 |
| 2 | 0 | 5 | 0 | 156 | 7 |
| 1 | 3 | 3 | 0 | 156 | 7 |
| 2 | 2 | 0 | 3 | 153 | 7 |
| 2 | 1 | 2 | 2 | 150 | 7 |
| 1 | 4 | 0 | 2 | 150 | 7 |
| 2 | 0 | 4 | 1 | 147 | 7 |
| 1 | 3 | 2 | 1 | 147 | 7 |
| 1 | 2 | 4 | 0 | 144 | 7 |
| 2 | 1 | 1 | 3 | 141 | 7 |
| 2 | 0 | 3 | 2 | 138 | 7 |

TABLE 1-continued

| OC4 8 | Gb E | OC1 2 | OC 3 | BW | Signals |
|---|---|---|---|---|---|
| 1 | 3 | 1 | 2 | 138 | 7 |
| 1 | 2 | 3 | 1 | 135 | 7 |
| 2 | 1 | 0 | 4 | 132 | 7 |
| 1 | 1 | 5 | 0 | 132 | 7 |
| 2 | 0 | 2 | 3 | 129 | 7 |
| 1 | 3 | 0 | 3 | 129 | 7 |
| 1 | 2 | 2 | 2 | 126 | 7 |

TABLE 2

| OC4 8 | Gb E | OC1 2 | OC 3 | BW | Signals |
|---|---|---|---|---|---|
| 1 | 1 | 4 | 1 | 123 | 7 |
| 2 | 0 | 1 | 4 | 120 | 7 |
| 1 | 0 | 6 | 0 | 120 | 7 |
| 1 | 2 | 1 | 3 | 117 | 7 |
| 1 | 1 | 3 | 2 | 114 | 7 |
| 2 | 0 | 0 | 5 | 111 | 7 |
| 1 | 0 | 5 | 1 | 111 | 7 |
| 1 | 2 | 0 | 4 | 108 | 7 |
| 1 | 1 | 2 | 3 | 105 | 7 |
| 1 | 0 | 4 | 2 | 102 | 7 |
| 1 | 1 | 1 | 4 | 96 | 7 |
| 1 | 0 | 3 | 3 | 93 | 7 |
| 1 | 1 | 0 | 5 | 87 | 7 |
| 1 | 0 | 2 | 4 | 84 | 7 |
| 1 | 0 | 1 | 5 | 75 | 7 |
| 1 | 0 | 0 | 6 | 66 | 7 |
| 3 | 1 | 2 | 0 | 192 | 6 |
| 2 | 4 | 0 | 0 | 192 | 6 |
| 3 | 1 | 1 | 1 | 183 | 6 |
| 3 | 0 | 3 | 0 | 180 | 6 |
| 2 | 3 | 1 | 0 | 180 | 6 |
| 3 | 1 | 0 | 2 | 174 | 6 |
| 3 | 0 | 2 | 1 | 171 | 6 |
| 2 | 3 | 0 | 1 | 171 | 6 |
| 2 | 2 | 2 | 0 | 168 | 6 |
| 1 | 5 | 0 | 0 | 168 | 6 |
| 3 | 0 | 1 | 2 | 162 | 6 |
| 2 | 2 | 1 | 1 | 159 | 6 |
| 2 | 1 | 3 | 0 | 156 | 6 |
| 1 | 4 | 1 | 0 | 156 | 6 |
| 3 | 0 | 0 | 3 | 153 | 6 |
| 2 | 2 | 0 | 2 | 150 | 6 |
| 2 | 1 | 2 | 1 | 147 | 6 |
| 1 | 4 | 0 | 1 | 147 | 6 |
| 2 | 0 | 4 | 0 | 144 | 6 |
| 1 | 3 | 2 | 0 | 144 | 6 |
| 2 | 1 | 1 | 2 | 138 | 6 |
| 2 | 0 | 3 | 1 | 135 | 6 |
| 1 | 3 | 1 | 1 | 135 | 6 |
| 1 | 2 | 3 | 0 | 132 | 6 |
| 2 | 1 | 0 | 3 | 129 | 6 |
| 2 | 0 | 2 | 2 | 126 | 6 |
| 1 | 3 | 0 | 2 | 126 | 6 |
| 1 | 2 | 2 | 1 | 123 | 6 |
| 1 | 1 | 4 | 0 | 120 | 6 |
| 2 | 0 | 1 | 3 | 117 | 6 |
| 1 | 2 | 1 | 2 | 114 | 6 |
| 1 | 1 | 3 | 1 | 111 | 6 |
| 2 | 0 | 0 | 4 | 108 | 6 |
| 1 | 0 | 5 | 0 | 108 | 6 |
| 1 | 2 | 0 | 3 | 105 | 6 |
| 1 | 1 | 2 | 2 | 102 | 6 |
| 1 | 0 | 4 | 1 | 99 | 6 |
| 1 | 1 | 1 | 3 | 93 | 6 |
| 1 | 0 | 3 | 2 | 90 | 6 |
| 1 | 1 | 0 | 4 | 84 | 6 |
| 1 | 0 | 2 | 3 | 81 | 6 |
| 1 | 0 | 1 | 4 | 72 | 6 |
| 1 | 0 | 0 | 5 | 63 | 6 |
| 3 | 2 | 0 | 0 | 192 | 5 |
| 3 | 1 | 1 | 0 | 180 | 5 |
| 3 | 1 | 0 | 1 | 171 | 5 |
| 3 | 0 | 2 | 0 | 168 | 5 |
| 2 | 3 | 0 | 0 | 168 | 5 |
| 3 | 0 | 1 | 1 | 159 | 5 |
| 2 | 2 | 1 | 0 | 156 | 5 |
| 3 | 0 | 0 | 2 | 150 | 5 |
| 2 | 2 | 0 | 1 | 147 | 5 |
| 2 | 1 | 2 | 0 | 144 | 5 |
| 1 | 4 | 0 | 0 | 144 | 5 |
| 2 | 1 | 1 | 1 | 135 | 5 |
| 2 | 0 | 3 | 0 | 132 | 5 |
| 1 | 3 | 1 | 0 | 132 | 5 |
| 2 | 1 | 0 | 2 | 126 | 5 |
| 2 | 0 | 2 | 1 | 123 | 5 |
| 1 | 3 | 0 | 1 | 123 | 5 |
| 1 | 2 | 2 | 0 | 120 | 5 |
| 2 | 0 | 1 | 2 | 114 | 5 |
| 1 | 2 | 1 | 1 | 111 | 5 |
| 1 | 1 | 3 | 0 | 108 | 5 |
| 2 | 0 | 0 | 3 | 105 | 5 |
| 1 | 2 | 0 | 2 | 102 | 5 |
| 1 | 1 | 2 | 1 | 99 | 5 |
| 1 | 0 | 4 | 0 | 96 | 5 |
| 1 | 1 | 1 | 2 | 90 | 5 |
| 1 | 0 | 3 | 1 | 87 | 5 |
| 1 | 1 | 0 | 3 | 81 | 5 |
| 1 | 0 | 2 | 2 | 78 | 5 |
| 1 | 0 | 1 | 3 | 69 | 5 |
| 1 | 0 | 0 | 4 | 60 | 5 |
| 4 | 0 | 0 | 0 | 192 | 4 |

Figure 5:
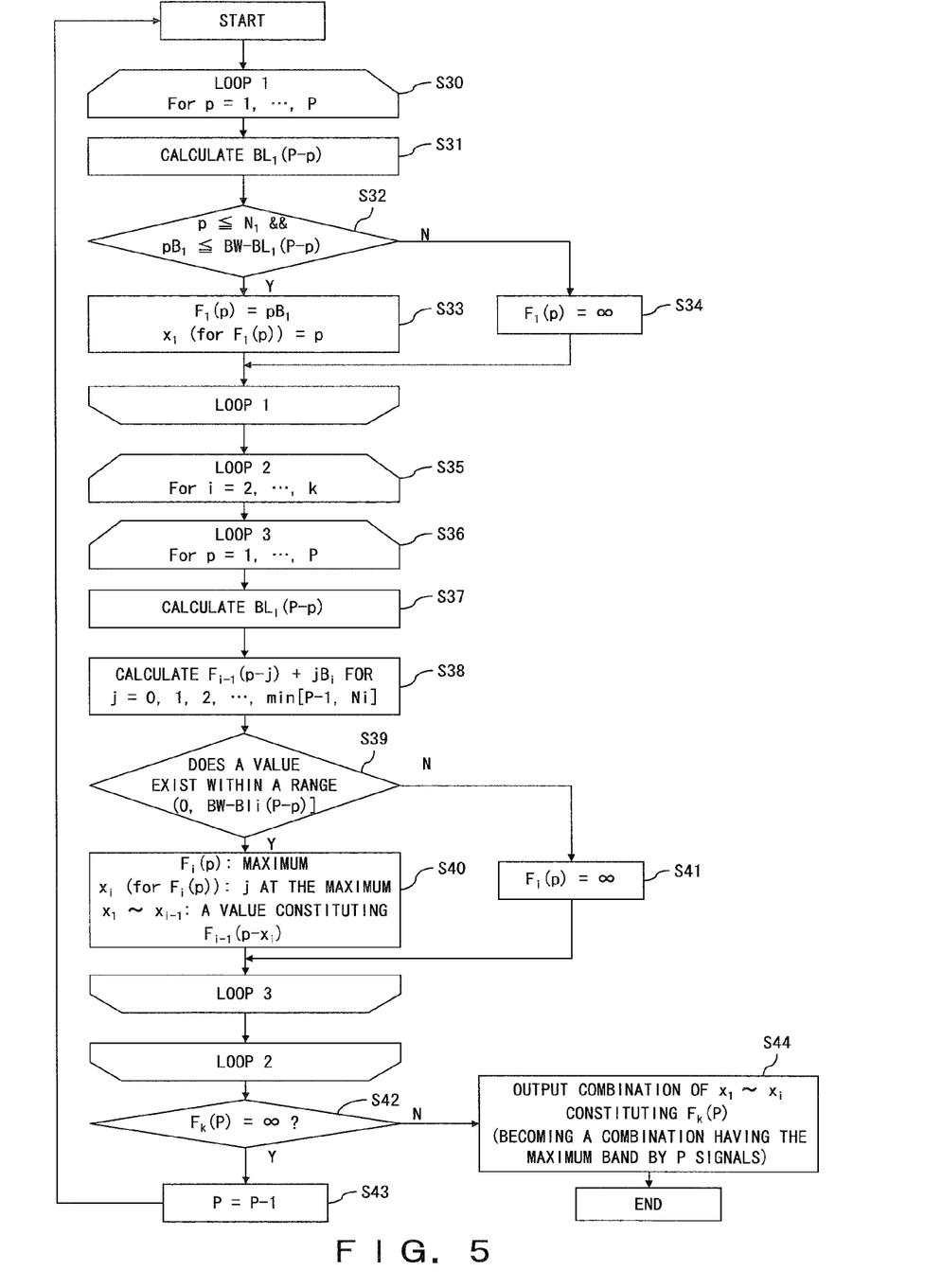
FIG. 5 is a flow chart describing a second example of a process within the dotted line shown in FIG. 4.

FIG. 5 is a flow chart describing a second example of a process within the dotted line shown in FIG. 4. This example applies an algorithm based on a dynamic programming to the process within the dotted line box shown in FIG. 4. In the following description, a P is the number of client ports of one optical transponder card, and a BW is an optical signal band.

The present process first obtains a combination of which the number of signals is P and the total bandwidth gains the maximum from among combinations which can be generated by signals having the maximum bandwidth. Then it obtains a client signal having the second largest bandwidth and obtains a combination of which the number of all signals is P and the total bandwidth gains the maximum. The process continues to search combinations by a similar procedure and extracts combinations including all the client signals.

The next description is of a specific calculation means. Here, definition is as follows:

If there are k categories of given client signals, the individual client signal categories are represented by $C_1$, $C_2$ through $C_k$ in a descending order of bandwidths of individual signals. Bandwidths of the individual signals are defined as $B_1$, $B_2$ through $B_k$, and the numbers of signals given as a traffic demand are defined as $N_1$, $N_2$ through $N_k$. An $x_i$ is the number of signals to be extracted from individual client category, a $BL_i(P-p)$ is the minimum total bandwidth (i.e., the total bandwidth of all the target signals if the number of target signals are less than (P−p)) among combinations which use (P−p) client signals between $C_{i+1}$ and $C_k$.

Here, defining an F as an objective function for obtaining the total bandwidth of a combination, a purpose of the present process can be defined as follows:

<Proposition 1>

[Expression 1]

An objective:

to maximize an objective function $$F = \sum_{i=1}^{k} B_i \times x_i$$

in a range of $0 < F \leq BW$
Constraint Condition:

$$\sum_{i=1}^{k} x_i = P$$

$1 \leq x_1 \leq \min[P, N_1]$ $0 \leq x_i \leq \min[P-1, N_i] (i=2, 3, \ldots, k)$ where the i is defined as an arbitrary natural number in a range [1, k], the $x_i$ is defined as the number of client signals to be extracted from a client signal $C_i$, and the min [ ] function is a function for calculating the minimum value among the values in the parentheses [ ].

The next consideration is to define an $f_i(p)$ as a partial sum of the F and calculate the maximum value thereof. The partial sum $f_i(p)$ is defined as the total bandwidth of a combination in the case of integrating a total of p individual client signals of them from $C_1$ to $C_i$, where $1 \leq p \leq P$.

Here a proposition is defined as follows:
<Proposition 2>
[Expression 2]
An objective:
to maximize an objective function $$f_i(p) = \sum_{l=1}^{i} B_l \times x_l$$

in a range of $0 < f_i(p) \leq BW - BL_i(P-p)$:
Constraint Condition:

$$\sum_{l=1}^{i} x_l = p$$

$1 \leq x_i \leq \min[p, N_1]$ $0 \leq x_l \leq \min[p-1, N_l] (l=2, 3, \ldots, i)$ where the l is defined as an arbitrary natural number in a range [1, i], the $x_l$ is defined as the number of client signals to be extracted from a client signal $C_l$. The reason for defining the $(BW - BL_i(P-p))$ as the upper limit of an $f_i(p)$ is that it is not possible to generate a combination of P signals of which the total bandwidth does not exceed the BW even by selecting combinations gaining: $BW - BL_i(P-p) < f_i(p) \leq BW$ and adding the remaining (P-p) signals when calculating the $f_i(p)$. If the total number of client signals between $C_{i+1}$ and $C_k$ is less than (P-p), however, the $BL_i(P-p)$ is defined as the following:

$$BL_i(P - p) = \sum_{l=i+1}^{k} B_l \times N_l \qquad \text{[Expression 3]}$$

Where the maximum value of partial sums $f_i(p)$ obtained by the proposition 2 are $F_i(p)$, it can be expressed as:

$$F_1(p) = \begin{cases} pB_1 & (\text{where } p \leq N_1 \text{ and } pB_1 \leq BW - BL_1(P-p)) \\ \infty & (\text{where } p > N_1 \text{ or } pB_1 > BW - BL_1(P-p)) \end{cases} \qquad \text{[Expression 4]}$$

And, as for i=2 through k, the $F_i(p)$ can be expressed by using an $F_{i-1}(p)$ as follows. If, however, an $f_i(p)$ gaining $0 < f_i(p) \leq BW - BL_i(P-p)$ cannot be obtained, the $F_i(p)$ is defined as infinite ("∞"). The $F_i(p)$ is determined as the maximum value among existing in a range $(0, BW - BL_i(P-p)]$ among values given by $\{B_i * j + F_{i-1}(p-j)\}$ for integers j=0, 1 through min $[p-1, N_i]$.

Here, the number of signals $x_i$ of client signals $C_i$ to be extracted is a value of j gaining the maximum of the $\{B_i * j + F_{i-1}(p-j)\}$ determining the above described $F_i(p)$. And, the numbers of signals $x_1$ through $x_{i-1}$ of client signals from $C_1$ through to $C_{i-1}$ are obtained from the calculation process of an $F_{i-1}(p-x_i)$. If a plurality of combinations of which the number of signals is equal to a bandwidth, the process selects a combination of which the number of client signals having a large bandwidth is large.

Having obtained the $F_i(p)$ starting from i=1 sequentially by the above described process, the objective function of the proposition 1, i.e., the F, is determined from an $F_k(P)$. If $F_k(p) \neq \infty$, then a combination of P client signals is selected. Contrarily if $F_k(p) = \infty$, a combination of P signals cannot apparently be generated, and therefore the process makes P=P-1 and tries a combination search process again.

The next description is of the above noted algorithm according to FIG. 5.

The loop 1 of the step S30 carries out the processes of the steps S31 through S34 repeatedly relating to the integer values p of 1 through P. The step S31 calculates the $BL_1(P-p)$. The step S32 judges whether or not the following holds:

$p \leq N_1$, and $pB_1 \leq BW - BL_1(P-p)$

If the judgment in the step S32 is "no", $F_1(p) = \infty$ is determined. Whereas if the judgment in the step S32 is "yes", an $x_1 = p$ is determined for $F_1(p)$ and $F_1(p) = pB_1$ is determined.

The loop 2 of the step S35 carries out the processes of the step S36 through S41 repeatedly relating to an integer value i of 2 through k. The loop 3 of the step S36 repeats the process of the steps S37 through S41 relating to the integer values of 1 through P. The step S37 calculates $BL_i(P-p)$. The step S38 calculates $F_{i-1}(p-j) + jB_i$ for j=0, 1, 2 through min $[P-1, N_i]$. The step S39 judges whether or not a value exists in a range $(0, BW - BL_i(P-p)]$ among the values calculated in the step S38. If the judgment in the step S39 is "no", an $F_i(p) = \infty$ is determined. If the judgment in the step S39 is "yes", the process determines the $F_i(p)$ as the maximum value of it, an $x_i$ corresponding to the $F_i(p)$ as j, and $x_1$ through $x_{i-1}$ as values constituting the $F_{i-1}(p-x_i)$. The step S42 judges whether or not the $F_k(P)=\infty$. If the judgment in the step S42 is "yes", the step S43 determines a P=P−1, followed by the process returning to the start. If the judgment in the step S42 is "no", the process outputs a combination of $x_1$ through $x_i$, outputting a combination of P signals having the maximum band.

The above described process calculates the maximum value of variable values having various limitations, which can be accomplished by making a computer generate variable values encompassing all possible cases and select the maximum value satisfying the limitations.

The next description exemplifies this process. Here, the assumption is P=8 and BW=192. Client signals are four kinds, i.e., $C_1$: OC 48, $C_2$: GbE, $C_3$: OC 12 and $C_4$: OC 3, with the GbE being assumed to be accommodated by using the Virtual Concatenation function of the SONET and being handled as STS-1-21v. The number of given individual client signals is assumed to be ten, that is, $B_1$=48, $B_2$=21, $B_3$=12, $B_4$=3 and $N_i$=10 (where i=1, 2, 3 and 4).

The following lists output values of the $BL_i(P-p)$, $F_i(p)$ and $x_i$ sequentially. Where shown by underlines are selected maximum values. If there is a plurality of combinations having the same bandwidth, the selected combination is indicated by the parentheses [ ]. From a result of eventually calculated $F_4(8)$, the selected combinations in this case are $(x_1, x_2, x_3, x_4)$=(3, 1, 1, 3). Since the combination of (3, 1, 1, 3) is $N_i$=10, enabling an extraction of three combinations, and therefore the respective numbers of client signals after extracting the three combinations are now $(N_1, N_2, N_3, N_4)$=(1, 7, 7, 1). These remaining signal groups are likewise applied by the process so as to accommodate all the client signals in a plurality of optical transponder cards.

Note that calculations of the $F_4(1)$ through $F_4(7)$ are basically not required since the $F_4(8)$ can be calculated from values of $F_3(p)$, it is noted just for a description, however.

$BL_1(7)=21$, $F_1(1)=48$, $x_1=1$ $BL_1(6)=18$, $F_1(2)=96$, $x_1=2$ $BL_1(5)=15$, $F_1(3)=144$, $x_1=3$ $BL_1(4)=12$, $F_1(4)=\infty$ $BL_1(3)=9$, $F_1(5)=\infty$ $BL_1(2)=6$, $F_1(6)=\infty$ $BL_1(1)=3$, $F_1(7)=\infty$ $BL_1(0)=0$, $F_1(8)=\infty$ $BL_2(7)=21$, $F_2(1)=[\underline{48}]=48$, $x_1=1$, $x_2=0$ $BL_2(6)=18$, $F_2(2)=[\underline{96}, 21+48]=96$, $x_1=2$, $x_2=0$ $BL_2(5)=15$, $F_2(3)=[\underline{144}, 21+96, 42+48]=144$, $x_1=3$, $x_2=0$ $BL_2(4)=12$, $F_2(4)=[\infty, \underline{21+144}, 42+96, 63+48]=165$, $x_1=3$, $x_2=1$ $BL_2(3)=9$, $F_2(5)=[\infty, 21+\infty, 42+144, \underline{63+96}, 84+48]=159$, $x_1=2$, $x_2=3$ $BL_2(2)=6$, $F_2(6)=[\infty, 21+\infty, 42+\infty, 63+144, \underline{84+96}, 105+48]=180$, $x_1=2$, $x_2=4$ $BL_2(1)=3$, $F_2(7)=[\infty, 21+\infty, 42+\infty, 63+\infty, 84+144, 105+96, \underline{126+48}]=174$, $x_1=1$, $x_2=6$ $BL_2(0)=0$, $F_2(8)=[\infty, 21+\infty, 42+\infty, 63+\infty, 84+\infty, 105+144, 126+96, 147+48]=\infty$ $BL_3(7)=21$, $F_3(1)=[\underline{48}]=48$, $x_3=0$, $x_1=1$, $x_2=0$ ($F_2(1)$)

$BL_3(6)=18$, $F_3(2)=[\underline{96}, 12+48]=96$, $x_3=0$, $x_1=2$, $x_2=0$ ($F_2(2)$)

$BL_3(5)=15$, $F_3(3)=[\underline{144}, 12+96, 24+48]=144$, $x_3=0$, $x_1=3$, $x_2=0$ ($F_2(3)$)

$BL_3(4)=12$, $F_3(4)=[\underline{165}, 12+144, 24+96, 36+48]=165$, $x_3=0$, $x_1=3$, $x_2=1$ ($F_2(4)$)

$BL_3(3)=9$, $F_3(5)=[159, \underline{12+165}, 24+144, 36+96, 48+48]=177$, $x_3=1$, $x_1=3$, $x_2=1$ ($F_2(4)$)

$BL_3(2)=6$, $F_3(6)=[\underline{180}, 12+159, 24+165, [36+144], 48+96, 60+48]=180$, $x_3=3$, $x_1=1$, $x_2=0$ ($F_2(3)$) (Comparison of $x_1$)

$BL_3(1)=3$, $F_3(7)=[174, 12+180, \underline{24+159}, 36+165, 48+144, 60+96, 72+48]=183$, $x_3=2$, $x_1=2$, $x_2=3$ ($F_2(5)$)

$BL_3(0)=0$, $F_3(8)=[\infty, \underline{12+174}, 24+180, 36+159, 48+165, 60+144, 72+96, 84+48]=186$, $x_3=1$, $x_1=1$, $x_2=6$ ($F_2(7)$)

$BL_4(7)=0$, $F_4(1)=[\underline{48}]=48$, $x_4=0$, $x_1=1$, $x_2=0$, $x_3=0$ ($F_3(1)$)

$BL_4(6)=0$, $F_4(2)=[\underline{96}, 3+48]=96$, $x_4=0$, $x_1=2$, $x_2=0$, $x_3=0$ ($F_3(2)$)

$BL_4(5)=0$, $F_4(3)=[\underline{144}, 3+96, 6+48]=144$, $x_4=0$, $x_1=3$, $x_2=0$, $x_3=0$ ($F_3(3)$)

$BL_4(4)=0$, $F_4(4)=[\underline{165}, 3+144, 6+96, 9+48]=165$, $x_4=0$, $x_1=3$, $x_2=1$, $x_3=0$ ($F_3(4)$)

$BL_4(3)=0$, $F_4(5)=[\underline{177}, 3+165, 6+144, 9+96, 12+48]=177$, $x_4=0$, $x_1=3$, $x_2=1$, $x_3=1$ ($F_3(5)$)

$BL_4(2)=0$, $F_4(6)=[\underline{180}, [3+177], 6+165, 9+144, 12+96, 15+48]=180$, $x_4=1$, $x_1=3$, $x_2=1$, $x_3=1$ ($F_3(5)$) (Comparison of $x_1, x_2$)

$BL_4(1)=0$, $F_4(7)=[\underline{183}, [3+180], 6+177, 9+165, 12+144, 15+96, 18+48]=183$, $x_4=1$, $x_1=3$, $x_2=0$, $x_3=0$ ($F_3(6)$) (Comparison of $x_1$)

$BL_4(0)=0$, $F_4(8)=[\underline{186}, 3+183, 6+180, [9+177], 12+165, 15+144, 18+96, 21+48]=[\underline{186}, ],[\underline{x_4=3, x_1=3, x_2=1, x_3=1}]$ ($F_3(5)$) (Comparison of $x_1, x_2$)

Figure 6:
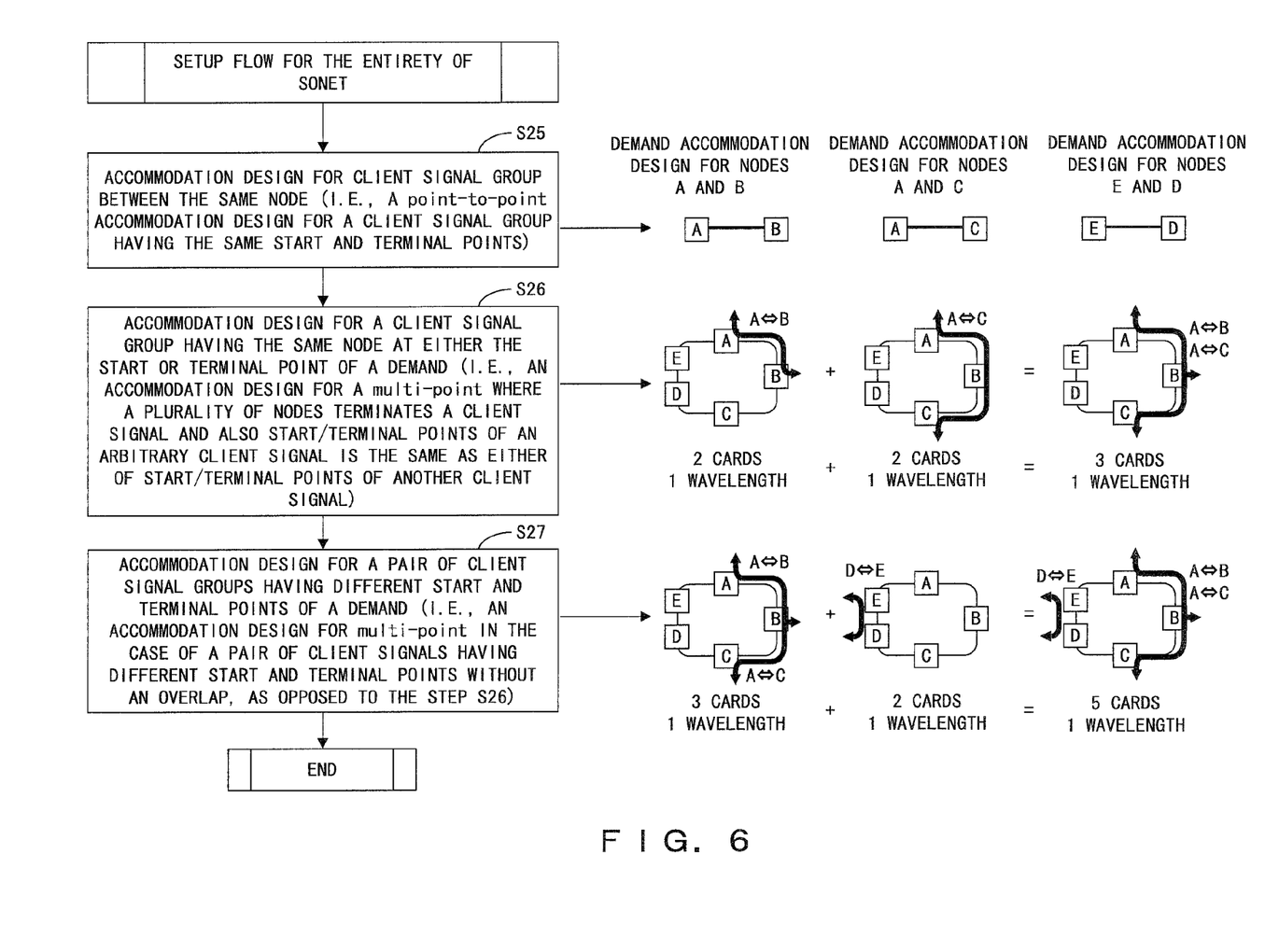
FIG. 6 is a flow chart exemplifying an operation of a design method of the present invention on a SONET/SDH ring network.

FIG. 6 exemplifies an operation of a design method of the present invention on a SONET/SDH ring network. The design method shown by FIG. 6 is applied in the case of carrying out a setup for the entirety of a SONET network.

The present design method is constituted by three steps. Each of the steps integrates client signals, which are given traffic demands, into client signal groups so as to be accommodated by optical signals at a WDM apparatus. The step S25 groups client signals given between the same nodes by applying the accommodation procedure shown in FIG. 4. The step S26 integrates client signal groups by grouping client signal group, among them generated in the step S25, having both client port and network band so as to share either of add/drop nodes. Here, the add/drop node means a station (i.e., a node) furnished with an optical transponder card for terminating a client signal which is a traffic demand. In the step S26, the number of required client side ports and the total bandwidth of a client signal group for common add/drop nodes are taken into consideration. Devising a sharing of an optical transponder card in the step S26 reduces the number of optical transponder cards required by the entirety of a network. The step S27 groups together client signal groups generated until the step S26 by only considering an optical signal band. The add/drop nodes of the client signal group integrated in the step S27 have a relationship of not mutually shared. Although the step 27 does not reduce the number of optical transponder cards, an effective use of an optical signal band reduces the number of SONET/SDH (ring) networks which is utilized by the entirety of the network, resulting in gaining the effect of reducing the number of optical signals (i.e., the number of wavelengths) in the case of building up a SONET/SDH network on a WDM network. After the process of the step S27 the generated all client signal groups are accommodated by one optical signal of the respective multiplexing apparatuses.

Figure 7:
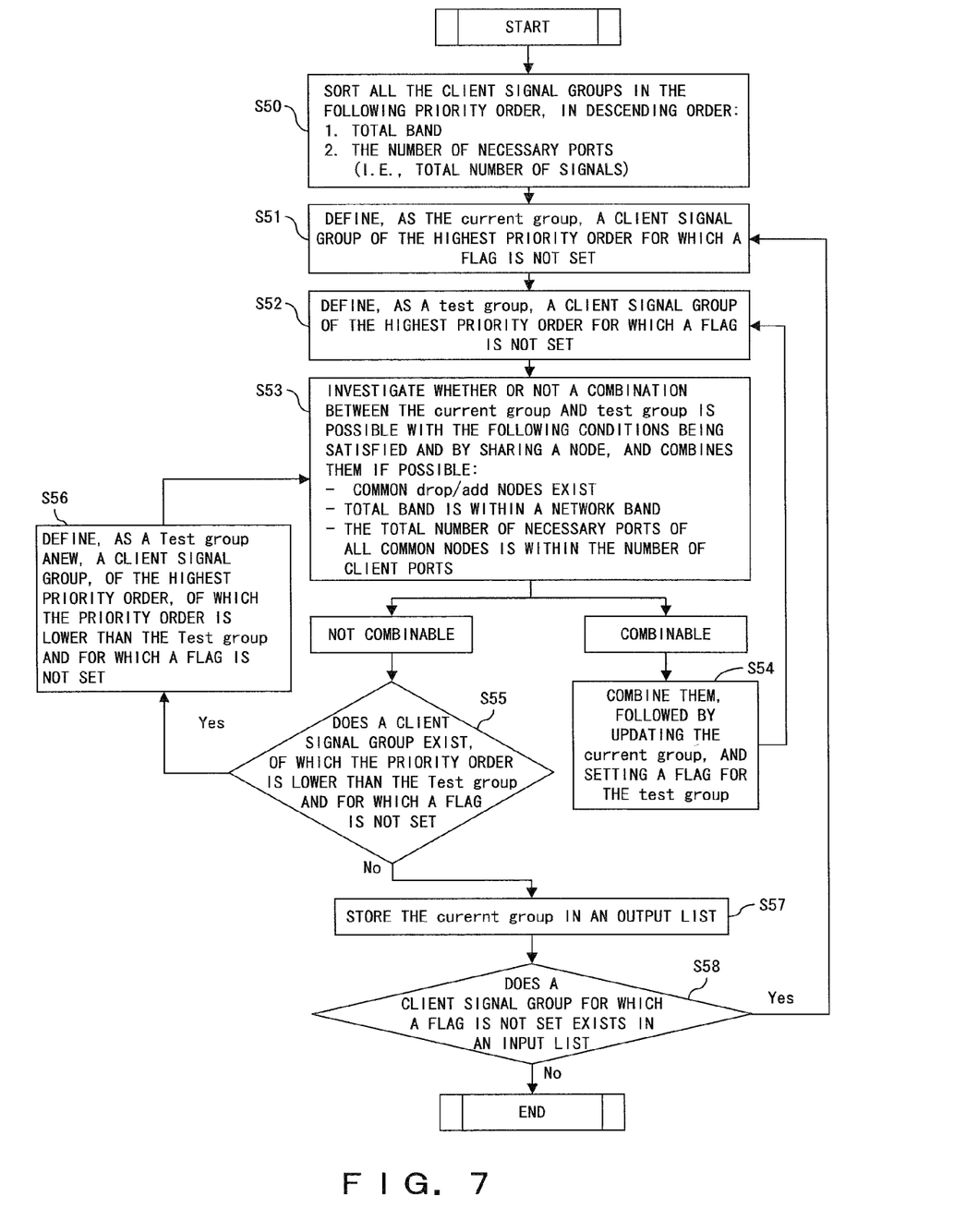
FIG. 7 is a detail flow chart of the step S26 shown in FIG. 6.

FIG. 7 is a detail flow chart of the step S26 shown in FIG. 6, exemplifying the case of accommodating a bidirectional client signal demand by a Unidirectional Path Switched Ring (UPSR) of SONET. Since signal transmissions are unidirectional in the SONET UPSR, paths in the entirety of a ring are utilized by bidirectional traffics.

The step S25 shown in FIG. 6 generates a client signal group from client signals exchanged between the same nodes by using the design method shown in FIG. 4. A client signal group is constituted by information of positions of add/drop nodes, the number of necessary ports of each node and a total band.

The step S26 and thereafter combines between client signal groups. The kinds of information necessary for client signal group in this event are three as follows:
Add/drop nodes
The number of client ports ("the number of ports" hereinafter) utilized at each add/drop node
Total bandwidth At the end of the step S25, the number of add/drop nodes for each client signal group is two ("2"), and the number of ports is the number of client signals.

The step S26 first extracts a client signal group of which the number of ports is less than P and also the total bandwidth is less than BW from among the client signal groups obtained as a result of the step S25, and sorts them according to a priority order as follows, in a descending order:
Total band
The number of necessary ports (i.e., total number of signals)

Then, among the client signal group having the highest priority order and the client signal group sharing a add/drop node and being possible to combine, a client signal group is combined with the one having the highest priority order and the combined signal group is defined as "processed". Furthermore, combination of a post-combination signal group with another client signal group sharing a node and being combinable is carried out by the same procedure, which is repeated until a combinable client signal group no longer exists. Then, the same process is repeated for a client signal group having the highest priority order among unprocessed client signal groups.

The next description is according to FIG. 7.

The step S50 sorts all the client signal groups in the following priority order in a descending order:
1. Total band
2. The number of necessary ports (i.e., total number of signals)

The step S51 determines, as the current group, a client signal group of the highest priority order for which a flag is not set for indicating a "processed" and sets a flag for it. The step S52 determines a client signal group of the highest priority order for which a flag is not set as a test group. The step S53 investigates whether or not a combination between the current group and test group is possible with the following conditions being satisfied and by sharing a node, and combines them if possible:
Common add/drop nodes exist
Total band is within a network band The total number of necessary ports of all common nodes is within the number of client ports If the step S53 judges "combinable", the step S54 combines them, followed by updating the current group, setting a flag for the test group and returning to the step S52. If the step S53 judges "not combinable", the step S55 judges whether or not a client signal group of which the priority order is lower than the test group and for which a flag is not set exists. If the judgment of the step S55 is "yes", the step S56 determines, as a test group anew, a client signal group, of the highest priority order, of which the priority order is lower than the test group and for which a flag is not set, followed by returning to the step S53. If the judgment of the step S55 is "no", the step S57 stores the current group in an output list, and the step S58 judges whether or not a client signal group for which a flag is not set exists in an input list. If the judgment of the step S58 is "yes", the process proceeds to the step S51, while if the judgment of the step S58 is "no", the process ends.

Figure 8:
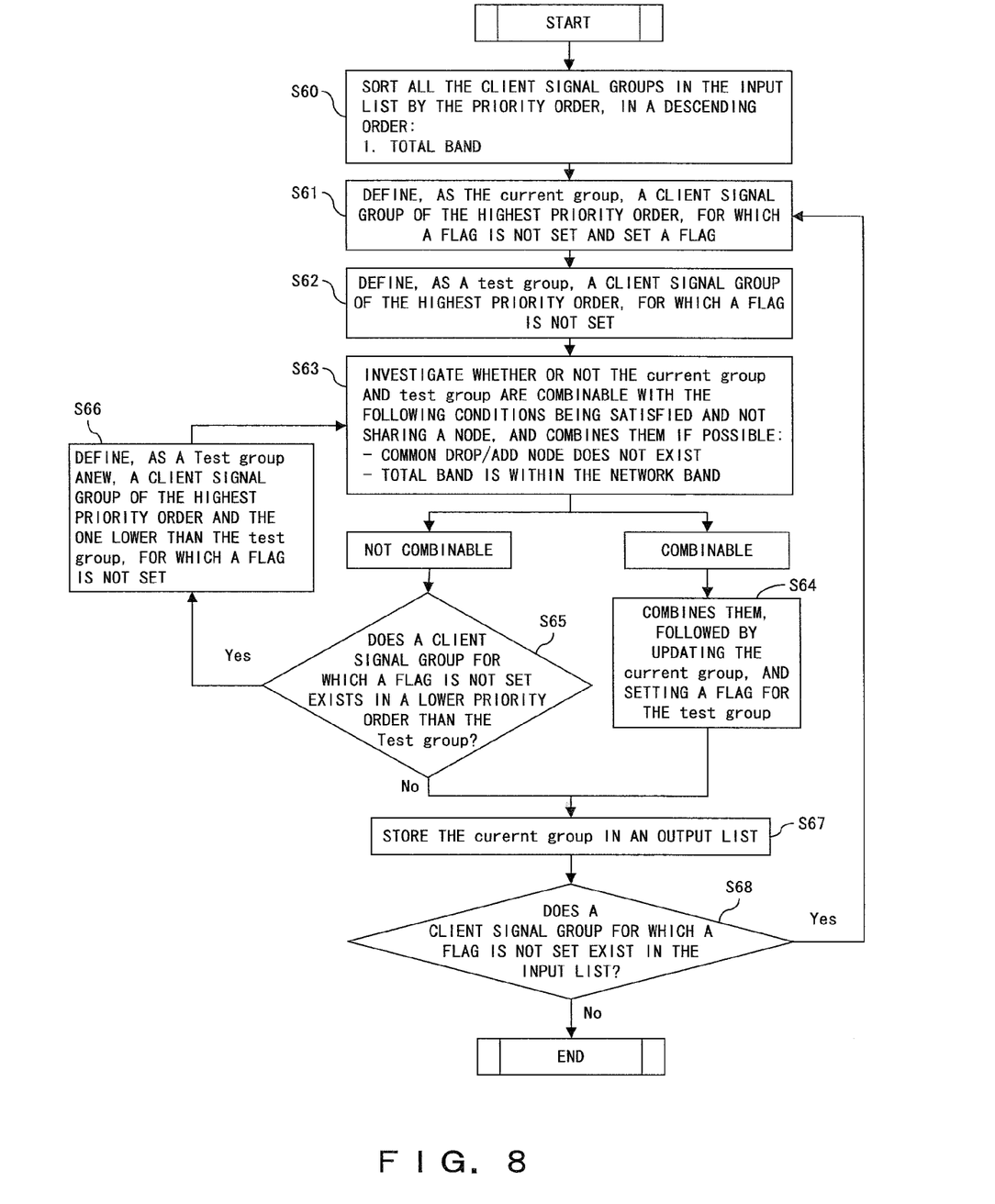
FIG. 8 is a detail flow chart of the step S27 shown in FIG. 6.

FIG. 8 is a detail flow chart of the step S27 shown in FIG. 6.

The step S27 extracts client signal groups of which the total bandwidth is less than BW from among the client signal groups generated in the steps S25 and S26 and sorts them in order of the total bandwidth. This is followed by combining client signal groups having the highest priority order among the client signal groups not sharing a node and being combinable for client signal groups having the highest priority order, and defining the combined client signal group as "processed". This is further followed by combining the combined client signal groups with another client signal group not sharing a node and being combinable by the same procedure, repeating the same process until a combinable client signal group no longer exists. This is further followed by repeating the same process for the client signal group having the highest priority order among them which have not been "processed".

Now a description follows FIG. 8. Input information of FIG. 8 is all the client signal groups obtained by the process shown in FIG. 7. All the client signal groups are constituted by positions of add/drop nodes and a total band. The step S60 sorts all the client signal groups in the input list by the priority order of the total band. The step S61 defines, as the current group, a client signal group of the highest priority order, for which a flag is not set for indicating a "processed", and sets a flag. The step S62 defines, as a test group, a client signal group of the highest priority order, for which a flag is not set. The step S63 investigates whether or not the current group and test group are combinable with the following conditions being satisfied and not sharing a node, and combines them if possible:
Common add/drop node does not exist
Total band is within the network band If the step S63 judges "not combinable", the process proceeds to the step S65 which judges whether or not a client signal group for which a flag is not set exists in a lower priority order than the test group. If the judgment in the step S65 is "yes", the step S66 defines, as a test group anew, a client signal group of the highest priority order and the one lower than the test group, for which a flag is not set, followed by returning to the step S63. If the judgment in the step S65 is "no", the step S67 stores the current group in an output list. If the step S63 judges "combinable", the step S64 combines them, followed by updating the current group, setting a flag for the test group and proceeding to the step S67. The step S67 stores the current group in an output list. The step S68 judges whether or not a client signal group for which a flag is not set exists in the input list. If the judgment in the step S68 is "yes", the process returns to the step S61. If the judgment in the step S68 is "no", the process ends.

Figure 9:
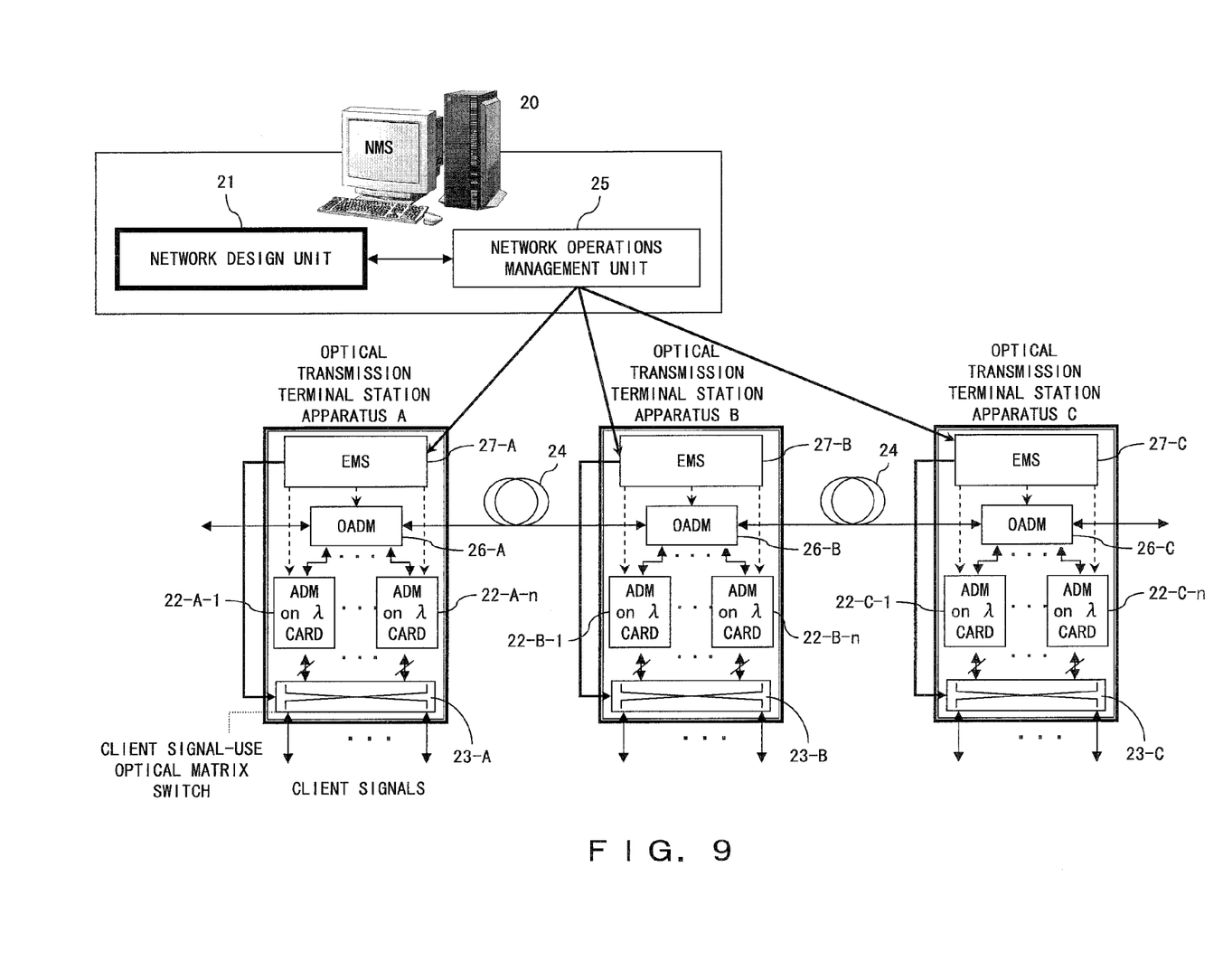
FIG. 9 is a diagram exemplifying a configuration of an optical network including a network management system comprising a network design unit which is applied by a design method according to an embodiment of the present invention.

FIG. 9 exemplifies a configuration of an optical network including a network management system (NMS) comprising a network design unit which is applied by a design method according to an embodiment of the present invention.

The present application example equips a network design unit 21 for automatically carrying out the design method according to an embodiment of the present invention on an NMS 20, and comprises optical transponder cards 22-A-1 through 22-A-n, 22-B-1 through 22-B-n and 22-C-1 through 22-C-n which comprise an ADM on λ function for a client interface of an optical node, and optical matrix switches 23-A, 23-B and 23-C at the client side input/output part of the ADM on λ card. And this comprisal constitutes an optical network configuration for controlling connections of the optical matrix switches 23-A, 23-B and 23-C based on a result of an accommodation design for client signals calculated by the network design unit 21 of the NMS 20 and carrying out a path setup for each client signal. An optical network according to the present application example comprises the NMS 20, optical transmission terminal station apparatuses A through C and optical fibers 24. The NMS 20 possesses the network design unit 21 in addition to a network operations management unit 25. The individual optical transmission terminal station apparatuses A through C comprise the optical matrix switches 23-A through 23-C, respectively, for changing over a forwarding of a client signal, the optical transponder cards 22-A-1 through 22-C-n, respectively, equipped with an ADM on λ function, Optical Add/Drop Multiplexing (OADM) apparatuses 26-A through 26-C, respectively, for dropping/adding a wavelength by a light as is and Equipment Management System (EMS) 27-A through 27-C, respectively, for carrying out an operations management of the OADMs. The EMS 27-A through 27-C, being connected to respective apparatuses within the optical transmission terminal station apparatuses A through C, are capable of automatically setting a wavelength added/dropped by the OADM apparatuses 26-A through 26-C, an optical transmission wavelength of the optical transponder cards 22-A-1 through 22-C-n and paths in the optical matrix switches 23-A through 23-C. The individual EMS 27-A through 27-C are connected to the NMS 20 and change a setup of each apparatus within the respective optical transmission terminal station apparatuses A through C based on an instruction from the NMS 20. The present application example makes it possible to apply the optimal accommodation of client signals automatically to an actual network.

When a change of a network configuration due to an addition/elimination of a fiber span is input to the NMS 20 from a manager during a network operation, the network design unit 21 comprised by the NMS 20 carries out an accommodation design for minimizing the number of optical transponder cards. As a result of the redesign, client signals accommodated by each optical transponder card within each of the optical transmission terminal station apparatuses A through C, optical transmission wavelengths and optical signal wavelengths dropped/added by each of the OADMs are determined anew. The determined individual setting are notified to the respective optical transmission terminal station apparatuses A through C, and setup changes of the path setups of the client side matrix switches, optical transmission wavelengths of the optical transponder cards and add/drop wavelengths at the OADM are carried out, thereby changing a configuration of the entirety of the network. If an optical transponder card becomes necessary anew as a result of redesigning at the NMS, an EMS manager of the relevant node is notified of an optical transponder card to be added and the inserting slot. In this event, there is a case of an already equipped optical transponder card becoming unnecessary in another site and therefore, if an existing optical transponder card can be used, the information of the moving optical transponder card is notified to the NMS manager and an EMS manager of each of optical transmission terminal station apparatuses requiring elimination and addition.

A redesign of a network is likewise carried out when a traffic demand is added. In this event, an operator designates a port on an optical matrix switch adding a client signal for the NMS, thereby controlling the optical matrix switch according to the above described network design result and enabling a start operating by connecting a client signal to a suitable optical transponder card.

What is claimed is:

1. An optical network design method for accommodating client signals in an optical transponder card, which is included in a multiplex apparatus used for an optical network, for outputting an optical signal by applying a time multiplexing and a wavelength multiplexing to signals from a client, comprising:

inputting, to a management apparatus for the optical network, a number of client signal ports of the optical transponder card, an optical signal band of the optical transponder card, a bandwidth of each client signal and a number of client signals having each bandwidth;

judging, by the management apparatus, whether or not a client signal having a bandwidth larger than a value of the optical signal bandwidth divided by the number of client signal ports exists;

extracting, by the management apparatus, a maximum number of combinations of client signals in which the number of client signals is equal to the number of client signal ports, each combination including at least one client signal having a maximum bandwidth and the total bandwidth of the combination being within the optical signal band, if a client signal having a bandwidth larger than a value of the optical signal bandwidth divided by the number of client signal ports does exist; and selecting, by the management apparatus, a combination of client signals in which a total band of the client signals becomes a maximum from among the extracted combinations as a combination of client signals accommodated in the optical transponder card.

2. The optical network design method according to claim 1, wherein said extracting lists possible combinations, with a predefined priority order, of client signals as a table in advance and extracts a required combination of client signals from the table.

3. The optical network design method according to claim 2, wherein said priority order places a combination of client signals of which the number of client signals accommodated in said optical transponder card is larger in higher order, among possible combinations of client signals.

4. The optical network design method according to claim 2, wherein said priority order places a combination of client signals of which a total bandwidth of client signals accommodated in said optical transponder card is larger in higher order, among possible combinations of client signals.

5. The optical network design method according to claim 2, wherein said priority order places a combination of client signals of which the number of client signals with large bandwidths is larger in higher order, among possible combinations of client signals.

6. The optical network design method according to claim 1, wherein said extraction step determines a combination of client signals accommodated in said optical transponder card by using an algorithm based on a dynamic programming for sequentially determining the number of the client signals so as to maximize a total band of the client signals, under a predefined band limit, starting from the number of client signals with a large bandwidth, which are to be accommodated in the optical transponder card.

7. The optical network design method according to claim 6, wherein said predefined band limit determines a value, as the upper limit, by subtracting a minimum bandwidth in the case of accommodating client signals in the number of remaining ports of said optical transponder card, which is a result of removing the number of already determined client signals, from an optical signal bandwidth of the optical transponder card.

8. An optical network design method, comprising:

allocating a client signal once by applying an optical network design method as set forth in claim 1 to every pair of said multiplexing apparatus which is included in said network, and applying an optical network design method as set forth in claim 1 to the multiplexing apparatus of which a port for accommodating a client signal is spared and which is common to the pair of the multiplexing apparatus, thereby optimizing an accommodation method for a client signal of the common multiplexing apparatus.

9. The optical network design method according to claim 8, which optimizes an accommodation of client signals in said multiplexing apparatus which does not become common relating to any client signal so as to utilize a maximum possible optical signal band of the multiplexing apparatus relating to an accommodation of client signals in the multiplexing apparatus included in said optical network.

10. A network designed by an optical network design method according to claim 1.

11. A computer-readable medium encoded with a computer program for accommodating client signals in an optical transponder card, which is included in a multiplex apparatus used for an optical network, for outputting an optical signal by applying a time multiplexing and a wavelength multiplexing to signals from a client, the program when executed by a computer causes the computer to perform a method comprising:

inputting a number of client signal ports of the optical transponder card, an optical signal band of the optical transponder card, a bandwidth of each client signal and a number of client signals having each bandwidth;

judging whether or not a client signal having a bandwidth larger than a value of the optical signal bandwidth divided by the number of the client signal ports exists;

extracting a maximum number of combinations of client signals in which the number of client signals is equal to the number of client signal ports, each combination including at least one client signal having a maximum bandwidth and the total bandwidth of the combination being within the optical signal band, if a client signal having a bandwidth larger than a value of the optical signal bandwidth divided by the number of client signal ports does exist; and selecting a combination of client signals in which a total band of the client signals becomes a maximum from among the extracted combinations as a combination of client signals accommodated in the optical transponder card.

* * * * *